United States Patent Office 3,206,367
Patented Sept. 14, 1965

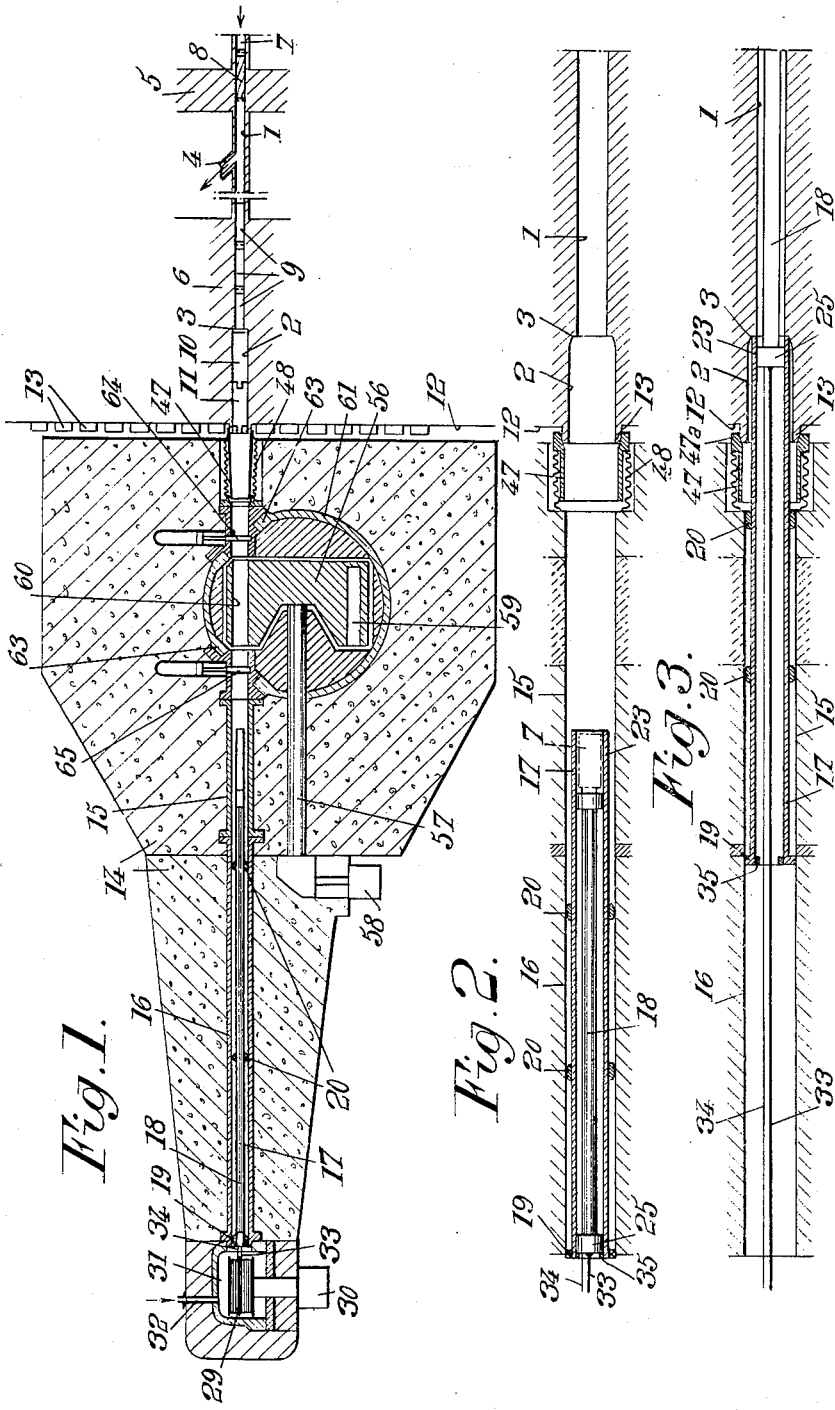

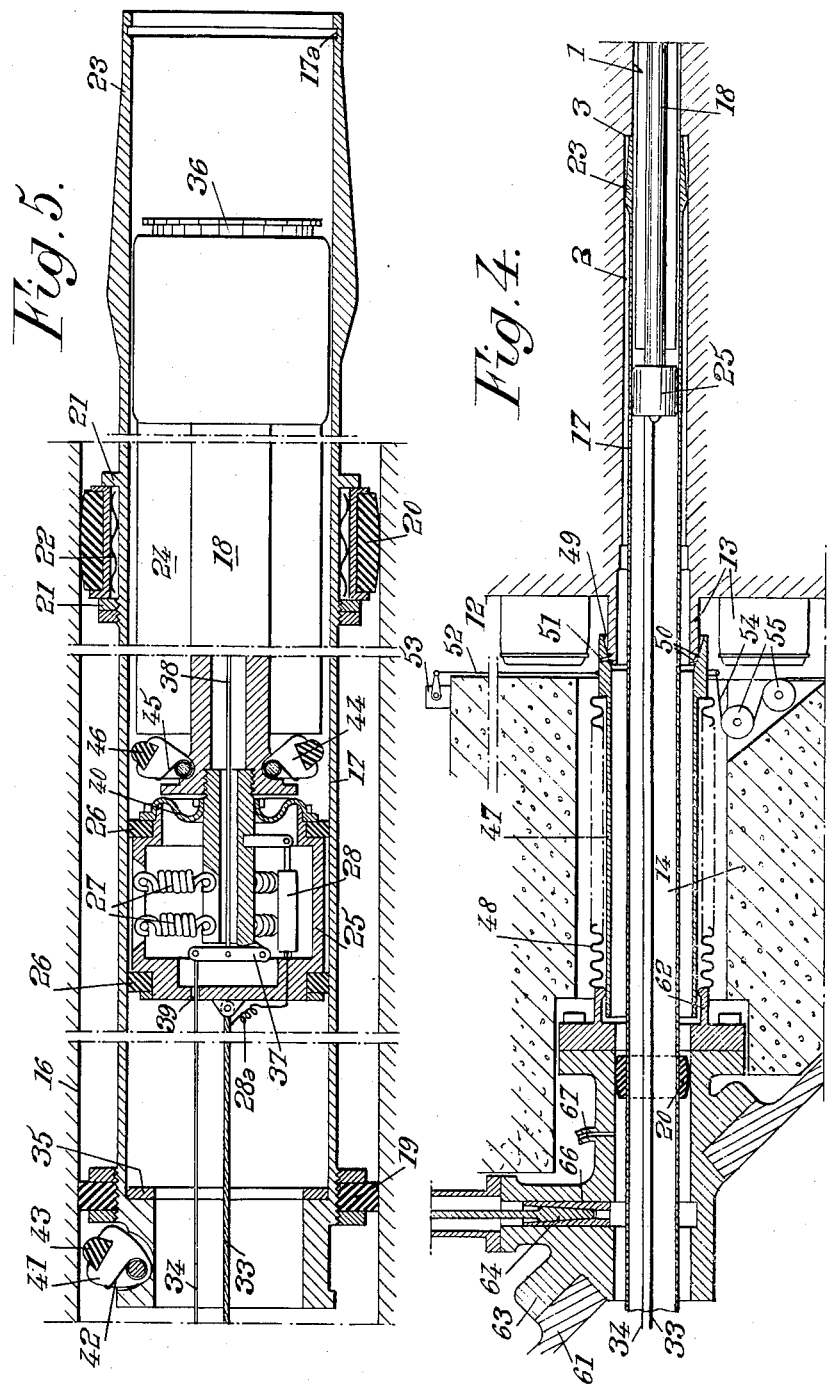

3,206,367
MACHINES FOR LOADING AND UNLOADING
THE CHANNELS OF A NUCLEAR REACTOR
Alphonse Peuchmaur, Boulogne, Claude Gillieron, La Garenne-Colombes, and Pierre Canet, Paris, France, assignors to Commissariat a l'Energie Atomique, Paris, France, an organization of France
Filed July 24, 1962, Ser. No. 212,011
Claims priority, application France, Aug. 16, 1961, 870,858
11 Claims. (Cl. 176—30)

Many reactors comprise rectilinear parallel tubular channels, generally horizontal, extending through the moderator mass and intended to contain fuel slugs; i.e. cylindrical blocks comprising a nuclear fuel and arranged to permit the flow of a cooling fluid through said channels. This fluid is introduced into every channel through an upstream extension thereof and it is collected from said channel through a downstream extension thereof, after it has been heated by its contact with the fuel slugs, said extensions forming channel portions located outside of the reactor core.

In some types of reactor, every channel extension opens into a loading and/or unloading flat face, where this channel is closed by a plug. The fluid inflow and outflow connections branch off laterally from this extension. Between such a connection and the plug nearer thereto, the channel extension contains protection slugs, i.e. cylindrical elements of absorbing materials capable of stopping the radiation in the longitudinal direction of the channels.

Special protection slugs, called "false slugs" may be disposed between every inflow or outflow connection and the fuel slugs. They must leave a passage for the cooling fluid while preventing direct transmission of radiations from the reactor core. In particular, they may be made of a moderator material and be placed in proximity of the fuel slugs in the region of the axial reflector of the moderator.

In order to modify the fuel loading in a channel it is necessary to withdraw, at one end of the channel, the plug, the protection slugs and the false slugs. The fuel slugs are then removed, and fresh fuel slugs are substituted, after which the false slugs, the protection slugs and the plug are replaced in position. If the channel may be opened at both ends, it is possible to effect a methodical circulation, by withdrawing a fuel slug through one end of the channel and pushing the whole set of slugs toward said end, together with a fresh fuel slug introduced through the other end of the channel.

The object of the present invention is to provide a machine capable, when the reactor is in operation, of loading or unloading the reactor channels, or preferably both of loading and unloading said channels.

It is important to note that reactor channels generally have the end portions of their extensions of sharply enlarged diameter. This sharp increase of the diameter is preferably provided in the region where the protection slugs are located so as to prevent the radiations from the reactor core from issuing directly through the annular space corresponding to the plays to be provided between the slugs and the inner wall of the channel. Thus the plugs and the protection slugs at the outer ends of the channel extensions have a diameter which is for instance from 1.3 to 1.5 times that of the other protection slugs, of the false slugs, and of the fuel slugs. This construction involves difficulties for pulling or pushing the plugs and slugs in the channels.

The object of our invention is a slug loading and unloading machine for use in connection with a nuclear reactor where the channels have a central portion of uniform diameter in the reactor core and at least one end portion of larger diameter opening into a free face of the reactor, said channels being capable of receiving on the one hand, in their central portions, elements of small diameter (fuel slugs, false slugs and protection slugs), i.e. elements of a diameter substantially equal to that of said central portions and, on the other hand, in their end portions, elements of larger diameter (protection slugs and plug) i.e. elements of a diameter substantially equal to that of said end portions.

The chief purpose of our invention is to obviate the above stated drawbacks.

According to our invention such a machine comprises, in combination, a frame guided with respect to said reactor so as to be movable parallelly to said free face thereof, said frame being provided with a longitudinal passage parallel to the direction of said reactor channels, an outer tube of an external diameter substantially equal to, although slightly smaller than, the diameter of said channel end portions, the internal diameter of said tube being equal to the diameter of said channel central portions, said tube being slidable longitudinally in said passage from a first position in which it is fully retracted therein to a second position where it projects therefrom into the end portion of a reactor channel opposite which said passage is located, first hooking or catching means provided at the end of said tube, adapted to project from said passage, for engaging said second elements, an inner rod slidable telescopically in said tube and the maximum external diameter of which is substantially equal to, although slightly smaller than, the diameter of said channel central portions, said rod being slidable in said tube from a first position where it is fully retracted therein to a second position where it projects therefrom and may engage into the central portion of a reactor channel opposite which said passage is located, second hooking or catching means provided at the end of said rod adapted to project from said tube for engaging said first elements and means for moving said tube and said rod with respect to said passage and said rod with respect to said tube.

Owing to such a machine, it is possible to withdraw (or to introduce) the elements of larger diameter successively by handling them by means of the outer tube, which is moved forwardly and rearwardly for this purpose, the inner rod being then retracted inside this tube. After this, we provide a continuous passage of small diameter by means of the central portion of the channel and of the inner wall of the tube, which is set in the position where it forms a lining for the end portion of the channel, and we can withdraw or introduce the elements of smaller diameter successively by catching them by means of the inner rod, said elements and said rod sliding smoothly in said continuous passage.

It is known that the hooking means of the inner rod must be particularly well adapted for pushing or pulling the fuel slugs, which are the more delicate elements and must not impose abnormal stresses to said means. Said means must be capable of working under high temperatures, they must not absorb too many neutrons and they must leave a sufficient passage for the cooling gas. In view of these conditions, said means would be badly adapted for the direct handling of the elements of a larger diameter, which are very heavy. This shows the advantage obtained according to the invention, of actuating these large diameter elements by means of the tube and not by means of the rod.

The machine comprises, for the temporary storing of the elements, both of small and of large diameter, a magazine communicating with a region of the passage where the outer tube and the inner rod are movable, this region being close to the nuclear reactor and disposed so that said tube and said rod can be retracted therefrom. Advantageously this magazine consists of a barrel, the housings of which are disposed parallelly to the axis of rotation of this barrel, at least one of the housings being open at both ends of permit displacements of said tube and said rod therethrough.

The displacements of the outer tube and of the inner rod may be ensured through any suitable means, such as a screw and nut device, a chain device, a rack device. However, in the preferred form of the invention, we make use of compressed fluid driving means.

For this purpose, sliding packing means are interposed, on the one hand between the outer wall of the external tube and the inner wall of the longitudinal passage of the machine and on the other hand between the inner wall of said tube and the inner rod, so that said tube is mounted in piston-like fashion in the passage and said rod is mounted in piston-like fashion in the tube, and a source of fluid under pressure is connected to said longitudinal passage beyond the region thereof along which move said sliding packing means, pulling means being provided for exerting on said tube and said rod forces opposed to the forces exerted thereon by said fluid under pressure whereby the tube and the rod can be moved toward the reactor by the action of the fluid under pressure, whereas said tube and said rod can be moved away from the reactor by said pulling means. Advantageously the outer tube and the inner rod are provided with safety means capable of locking them in case of failure of the pulling means, these safety means being for instance responsive to variations of the acceleration of the tube and of the rod moving toward the reactor.

The outer tube might remain in position in the end portion of large diameter of the channel while the elements of small diameter are being handled, the control means being then adapted to clear the movements of the magazine. However, preferably the pulling means are controlled in such manner as to enable the inner rod to project sufficiently from the outer tube to be able to catch the elements of small diameter, in the central portion, of small diameter, of the channel or to push them thereinto, but as to permit this rod to be retracted to the inside of the tube only by a limited amount, corresponding substantially to the length of an element of small diameter, whereby the outer tube contains and protects the elements of small diameter during their displacements inside the machine. A first advantage is that the length of sliding displacement of the fuel slugs, which are very brittle, is thus reduced. A second advantage consists in reducing the longitudinal dimension of the machine.

Advantageously the pulling means consist of cables or chains secured at one end to the outer tube and to the inner rod and wound at the other end on a winch capable of producing a limited relative longitudinal displacement between the tube and the rod.

The fluid under pressure which causes the tube and the rod to move forward through the longitudinal passage of the machine is advantageously identical to the cooling fluid, the pressure of the power fluid being of course higher than that of the cooling fluid, and a small leakage of the power fluid may be provided to cool down the means serving to control the hooking means of the tube and of the rod, the amount of fluid thus allowed to leak mixing with the cooling fluid which circulates through the channel.

In order to enable the outer tube to adapt itself to the reactor channel in which it is to be engaged, despite small errors in the alignment of the machine with respect to said reactor channel, we advantageously fix the sliding packing means interposed between said tube and the passage inner wall on the portion of said tube that it is at the greater distance from the reactor and we mount resiliently in the radial direction, on another portion of the tube, sliding guiding means, also interposed between the tube and the inner wall of the passage, the end portion of this tube which is to be engaged first into the reactor channel having a tapering, for instance frusto-conical, shape.

In a likewise manner, in order to ensure a gastight connection between the longitudinal passage of the machine and the reactor channel with which it is to cooperate, despite defective alignment of the machine with respect to the reactor, we provide, at the end of said passage, and coaxially therewith, an intermediate tube having some freedom of movement axially and transversely, a sealing member such as bellows being mounted between this intermediate tube and the passage, and the free end of this intermediate tube is given a shape which enables it to center itself in a gastight manner on the orifice of the reactor channel, when the machine is moved toward the reactor. For this purpose said orifice may be provided with an annular projection having a bevelled edge, and/or the intermediate tube may have its inner edge of bevelled shape.

Feeler means may be provided to permit of obtaining a good axial position of the machine. The force with which the machine is to be applied in the direction of the reactor, which comprises the force to be exerted on the flexible sealing means, the axial thrust due to the pressure of the cooling fluid and the forces exerted by the handling means, is supplied by jacks bearing either against the movable support of the machine, or against temporary connections provided between the machine and the loading face of the reactor. Valves are provided for insulating the magazine, both at the front and at the rear thereof. The front valve is closed to maintain the pressure inside the machine when it is not connected with a reactor channel. The rear valve is closed when it is desried, while keeping the magazine connected with the cooling circuit, to repair or to modify the handling means.

In addition to the channels, the reactor generally comprises false channels, also under fluid pressure, which contain fresh slugs to be subsequently introduced into the active channels or which are intended to receive used fuel slugs. These false channels are adapted to be opened and closed by the machine. The movable frame of this machine is provided with suitable biological protection means. The whole of the machine is cooled on the one hand by the cooling fluid arriving relatively cold at suitable points, for instance in every housing of the magazine, and on the other hand by water jackets. The machine therefore comprises either cooling fluid tanks or flexible pipes for the feed of said cooling fluid. It may be provided with accelerated cooling circuits, temperature exchangers, filters, and so on.

A preferred embodiment of our invention will be hereinafter described with reference to the appended drawings, given merely by way of example, and in which:

FIG. 1 is a diagrammatic axial section of a machine made according to our invention and of a portion of the nuclear reactor with which it is to operate;

FIG. 2 shows (with the transverse dimensions enlarged) the outer tube and the inner rod of FIG. 1 in the retracted position, coresponding to the showing of FIG. 1;

FIG. 3 is a view similar to FIG. 2, but with the tube and the rod engaged into a reactor channel;

FIG. 4 shows, on an enlarged scale, a portion of the reactor channel and the adjoining portion of the machine;

FIG. 5 shows, on a still larger scale, the essential portions of the outer tube and of the inner rod.

On the right hand side of FIG. 1, we have shown a nuclear reactor each of the channels of which comprises a central portion 1 of small diameter and an end portion 2 of large diameter, separated by a step or shoulder 3. A connection for the cooling fluid is shown at 4, this fluid circulating in the direction of the arrows. The core of the reactor is provided with a wall 5 and it is surrounded by a protective concrete mass 6. Every channel contains a set of fuel slugs such as 7, a false slug 8, protection slugs of small diameter 9, a protection slug of large diameter 10 and a plug 11. On the free face 12 of the reactor, the channels form annular projections 13.

The machine according to the present invention comprises a frame including a protective mass 14, for instance of lead or of high density concrete, this mass being made of blocks which may be taken apart to permit of reaching the mechanical parts. In this frame there is provided a longitudinal passage comprising a front tubular portion 15 and a rear tubular portion 16, the latter one being adapted to be removed so as to permit of reaching the movable parts of the machine. This passage 15–16 contains, coaxially mounted therein, the outer sliding tube 17 and the inner rod 18. Tube 17 is fitted with a packing member 19 which slides with a dry contact in tube 16 (FIG. 5). This member 19, which is rigidly fixed to the tube 17, consists for instance of a ring of felt impregnated with graphite or of rings having their edges provided with grooves and made of a material having a low friction coefficient such as polytetrafluoroethylene if the irradiation conditions make it possible. Tube 17 further carries centering members 20 having rounded external surfaces of a length sufficient to enable it to move past the grooves of valve seats which will be hereinafter referred to, this member 20, which is not required to be gastight, being for instance made of a soft metal or of polytetrafluoroethylene. As shown by FIG. 5, this member 20 is held in the axial direction between rigid guiding flanges 21 and it is mounted radially on spring 22, which permits important transverse displacements of the end 23 of the tube. This end 23 is of frusto-conical shape so as to center itself automatically.

Rod 18 consists of a rigid tube provided with longitudinal fins 24 and resiliently mounted on a sleeve 25 provided with packing rings 26. The resilient connection between rod 18 and sleeve 25 is ensured by springs 27 extending normally in a direction perpendicular to the axis of rod 18, these springs 27 taking oblique positions when rod 18 meets with a resistance in its longitudinal movement. A displacement controller 28, supplying for instance an electrical signal and interposed between rod 18 and sleeve 25, permits of measuring this resistance with a very great sensivity for the small resistances which correspond to the forward movement toward the element to be caught by rod 18. Packing means 26 are similar to the packing ring 19 of tube 17.

At the rear end of tube 16, the machine comprises a winch 29 (FIG. 1) driven by a motor 30. The chamber 31 of the winch communicates through a passage 32 with a source (not shown) of power fluid under pressure. On the drum of the winch are wound, on the one hand a main cable 33 secured to the end face of sleeve 25 and, on the other hand an auxiliary cable 34. The main cable 33 serves to pull back rod 18, and at the same time tube 17 in view of the fact that this tube carries a shoulder 35 against which sleeve 25 is applied when cable 33 pulls rod 18 toward the left. The auxiliary cable 34 serves to actuate, on the one hand, directly the means 36 carried by rod 18 to catch the elements of small diameter in the reactor channel and, on the other hand, indirectly the locking or fixation means carried by the elements of large diameter located in the reactor channel, said locking or fixation means being adapted to cooperate with a groove 17a provided at the end of tube 17 (FIG. 5). This cable 34 is fixed to a lever 37 pivoted on the rear end of tube 18, this lever 37 being connected through an axial transmission cable 38 with said catching means. The auxiliary cable 34 passes through a small orifice 39 provided in the end wall of sleeve 25. A small amount of power fluid may leak through said orifice 39 into the bore of rod 18 so as to cool it and also to cool catching means 36. A sealing diaphragm 40 supplies a gastight connection between sleeve 25 and the outer wall of rod 18.

To take into account a possible breaking of cable 33, safety means are provided in the form of members 41 pivotally mounted on tube 17 and which are subjected to the action of springs 42 tending to retract them. These members 41 pivot rearwardly and get wedged against the inner wall of tube 16 when the acceleration of tube 17 toward the right exceeds a given value, thus locking said tube 17 by engagement, with the inner wall of tube 16, of shoes 43 of relatively soft material carried by said members 41. We may also provide similar safety means intended to act in case of lack of tension of cable 33. In a likewise manner rod 18 is provided with pivoting members 44 subjected to the action of springs 45 and provided with shoes 46 to prevent said rod from running toward the right in case of breaking of cable 33.

This main cable 33 carries the electric transmission wire 28a of controller 28. The auxiliary cable 34, which is of much smaller cross-section than cable 33 may be wound and unwound parallelly to said cable 33, but its stretching must be capable of independent adjustment. For this purpose, we may use either a winch 29 having two synchronized drums or a winch with a single drum including for auxiliary cable 34, between the winch and tube 16, a tackle system of variable length controlled by a movable pulley.

At its front part, the machine is provided with an intermediate tube 47 which is connected in a gastight manner with the edge of the longitudinal passage 15–16 by a bellow 48 which permits axial or radial displacements of the end 47a of said tube 47. Tube 47 is centered at the rear by a fixed annular extension 62 and, at the front, it has a conical or spherical opening 49 adapted to bear against the rounded annular projection 13 of the reactor channel, with the interposition of one or two packing joints 50 which are preferably fixed to the projection 13 of the reactor and not to the machine. Thus checking and renewal of these joints are much less frequent. A leak recovery circuit 51 (FIG. 4) acting between these two packing joints 50 may be carried by the machine.

The above mentioned radial displacements of the end 49 of intermediate tube 47, which permit a very accurate centering, are controlled by wires 52 connected to reading devices such as 53. Likewise the axial displacements are registered for instance by means of a wire 54 passing on pulleys 55 and connected to a reading device which is not shown.

Finally the machine comprises a magazine in the form of a barrel 56 (FIG. 1) mounted on a shaft 57 adapted to be driven by a motor 58. This motor, and also the motor 30 serving to drive winch 29, are mounted on the outside of the protective mass 14 so that they can be reached when the reactor is in operation.

This barrel 56 is provided with a set of blind holes 59 forming housings or chambers adapted to receive the elements of small diameter 7, 8 and 9 and the elements of large diameter 10 and 11. Barrel 56 is also provided with a hole extending from one end to the other thereof so as to permit tube 17 to pass therethrough. Barrel 56 is advantageously housed in a spherical casing 61 provided with oblique closure plates 63 through which tube 17 may pass. Barrel 56 can be pneumatically insulated by means of a front valve 64 and of a rear valve 65. As shown by FIG. 4 these valves are of a conventional type, including two parallel seatings 66 which are forced apart, to obtain a gastight closure, by a wedge slidable between said seatings. The means for driving the valves may be located at a place accessible from the outside and connected to said valves through distance transmission means. As shown by FIG. 4, the bodies of valves 64 and 65 are combined with the oblique closure plates 63, which permits of reducing the total length of the machine. Finally the space between the front valve 64 and the projection 13 of a channel is provided with a draining circuit branched on connection 67.

The operation of this machine is as follows: The machine is brought opposite the desired channel 1, 2 and it is centered, first approximately, then in an accurate manner by means of devices 52–55. The machine is then moved forward so as to apply intermediate tube 47 against the annular projection 13 of the channel. The inside of intermediate tube 47 is drained through connection 67, and valves 64 and 65 are opened. The intermediate tube 47 had been compressed by the forward movement of the machine and the contact pressure is further increased when the space between the valve 65 and the plug 11 of the reactor channel is subjected to the pressure from conduit 32. According to a modification we displace in the axial direction, instead of the whole machine, only the mechanical part thereof without moving the heavy protective masses 14. We may still move only the end of intermediate tube 47, which may be replaced by a telescopic tube.

Barrel 56 is mounted in such manner as to bring housing 60 into line with tube 15. Winch 29 is allowed to turn so as to permit unwinding of cable 33, the fluid under pressure which arrives through conduit 32 pushing tube 17 toward the right until it is in contact with plug 11. Then rod 18 is also made to come into contact with said plug 11. By means of cable 34 we then operate catching means 36 so that they release plug 11 from the portion 2 of the reactor channel and they fix said plug 11 in the hooking groove 17a of tube 17. Winch 29 is then operated to pull cable 33 toward the left, which brings the sleeve 25 of rod 18 into contact with shoulder 35 and moves the whole of tube 17, plug 11 and rod 18 toward the left until the plug has moved beyond the region in which barrel 56 is located (position shown by FIG. 1). Barrel 56 is then rotated so as to bring into position passage 15 the housing 59 of said barrel which is to receive the plug, this housing having the same inner shape as the end portion of channel 2. Winch 29 is then operated to unwind cable 33 a small distance until the plug is engaged into its housing 59 were it is locked by the action of means 36.

The protection slug, or slugs, 10 of large diameter is, or are, removed in a similar manner and placed respectively in corresponding housings 59.

Then the protection slugs of small diameter 9 are removed by being caught directly by means 36, said slugs being engaged into the inlet end of tube 17. These protection slugs are each placed in a housing 59 of small diameter of barrel 56 against the opening of which tube 17 comes to bear whereas rod 18 pushes the protection slug into the corresponding housing 59, this protection slug being then detached from rod 18 when it is engaged in its housing. We proceed in the same manner with false slugs 8 and, in the case of unloading of a channel with the old fuel slug 7. In the case where it is desired to load a channel, we insert a new fuel slug previously placed in a housing 59 by pushing the whole set of slugs. Then the false slug 8, the protection slugs 9 and 10 and the plugs 11 are replaced into channel 1, 2. Finally the machine is withdrawn after closing valve 64 and draining intermediate tube 47 through connection 57.

It will be seen that, in retracted position, tube 17 is located at a distance from the left of valve 65 sufficient to permit of closing said valve even if a plug is wedged in this tube. Furthermore, as shown by FIG. 2, the catching means 36 come to a position well on the inside of tube 17 so that a fuel slug 7 can be fully housed inside said tube. In its end position toward the right (FIG. 3) tube 17 bears against shoulder 3 whereas its centering means 20 remain on the rectilinear rigid portion of the sliding passage without reaching movable tube 47. In this position, the sleeve 25 of rod 18 arrives at the end of tube 17 unless it is preferred not to let the packing joints 26 slide along the portion of said tube 17 which receives the fuel slugs 7.

In a general manner while we have, in the above description, disclosed what we deem to be a practical and efficient embodiment of our invention, we do not wish to be limited thereto as there might be changes made in the arrangement, disposition and form of the parts without departing from the principle of our invention as comprehended within the scope of the appended claims.

What we claim is:

1. For use in connection with a nuclear reactor having a free flat face, a multiplicity of parallel rectilinear channels, each comprising a central portion of uniform diameter and at least one end portion of greater diameter opening into said free face, said channels being adapted to receive in their central portion, first elements of a diameter slightly smaller than the diameter of said central portions and, in their end portions, second elements of a diameter slightly smaller than the diameter of said end portions, a machine for loading and unloading said elements into, and from, said channels, which machine comprises, in combination, a frame movable with respect to said reactor, said frame having a free flat face and being provided with a longitudinal passage parallel to the direction of said reactor channels when said frame free face is parallel to said reactor free face, an external tube of an external diameter slightly smaller than the diameter of said channel end portions, the internal diameter of said tube being equal to the diameter of said channel central portions, said tube being slidable longitudinally in said passage from a first position in which it is fully retracted therein to a second position where it projects therefrom into the end portion of a reactor channel opposite which said passage is located, first hooking means provided at the end of said tube adapted to project from said passage, for engaging said second elements, an inner rod slidable telescopically in said tube and the maximum external diameter of which is slightly smaller than the diameter of said channel central portions, said rod being slidable in said tube from a first position where it is fully retracted therein to a second position where it projects therefrom and may engage into the central portion of a reactor channel opposite which said passage is located, second hooking means provided at the end of said rod adapted to project from said tube for engaging said first elements, and means for moving said tube and said rod with respect to said passage and said rod with respect to said tube.

2. A machine according to claim 1 comprising, in said frame, a magazine for temporarily receiving said first and said second elements, said magazine comprising cylindrical housings for said elements, said magazine being movable in said frame to bring said cylindrical housings successively into line with said passage in a portion thereof close to its end adjoining a reactor channel, said passage portion being one out of which both said tube and said rod can be retracted.

3. A machine according to claim 1 wherein said frame is formed with a closed recess comprising a portion of said passage and further comprising a barrel rotatable in said recess about an axis parallel to said passage, said barrel being provided with a plurality of cylindrical housings parallel to said axis and at equal respective distances therefrom, said housings being adapted to come respectively, during the rotation of said barrel, into line with said passage, one of said housings being open at both ends thereof.

4. For use in connection with a nuclear reactor having a free flat face, a multiplicity of parallel rectilinear channels, each comprising a central portion of uniform diameter and at least one end portion of greater diameter opening into said free face, said channels being adapted to receive in their central portion, first elements of a diameter slightly smaller than the diameter of said central portions and, in their end portions, second elements of a diameter slightly smaller than the diameter of said end portions, a machine for loading and unloading said elements into, and from, said channels, which machine comprises, in combination, a frame movable with respect to said reactor, said frame being a free flat face and being provided with a longitudinal passage parallel to the direction of said reactor channels when said frame free face is parallel to said reactor free face, an external tube of an external diameter slightly smaller than the diameter of said channel end portions, the internal chamber of said tube being equal to the diameter of said channel central portions, said tube being slidable longitudinally in said passage from a first position in which it is fully retracted therein to a second position where it projects therefrom into the end portion of a reactor channel opposite which said passage is located, first hooking means provided at the end of said tube adapted to project from said passage, for engaging said second elements, an inner rod slidable telescopically in said tube and the maximum external diameter of which is slightly smaller than the diameter of said channel central portions, said rod being slidable in said tube from a first position where it is fully retracted therein to a second position where it projects therefrom and may engage into the central portion of a reactor channel opposite which said passage is located, second hooking means provided at the end of said rod adapted to project from said tube, for engaging said first elements, sliding packing means interposed between the outer wall of said tube and the inner wall of said passage, sliding packing means interposed between said rod and the inner wall of said tube, so that said tube is mounted in piston-like fashion in said passage and said rod is mounted in piston-like fashion in said tube, means for feeding a fluid under pressure into said passage at the end thereof located at the greater distance from said reactor, and pulling means for exerting, on said tube and said rod, forces opposed to the forces exerted thereon by said fluid under pressure.

5. A machine according to claim 4 further comprising safety means carried by said tube and said rod and adapted to cooperate with the inner wall of said passage and the inner wall of said tube, respectively, for locking said tube and said rod with respect to said passage and said tube, respectively, in case of failure of said pulling means.

6. A machine according to claim 4 wherein said rod is so dimensioned with respect to said tube that when it is fully retracted therein, a first element engaged by said second hooking means is housed in the end of said tube, where it is protected during the travel of said tube toward said winch.

7. A machine according to claim 4 wherein said pulling means comprise at least one cable fixed to said rod and a winch for pulling said rod in the direction opposed to that of the pressure force exerted by said fluid under pressure.

8. A machine according to claim 4 wherein said pulling means consist of a cable fixed to said rod and a winch in said mentioned end of said passage for pulling said cable to control the position of said rod pushed by said fluid under pressure, said rod and said tube comprising cooperating respective abutment means for transmitting the pull of said cable to said tube when said rod is fully retracted in said tube.

9. A machine according to claim 4 wherein said packing means interposed between the outer wall of said tube and the inner wall of said passage are fixed to the end of said tube at the greater distance from said reactor, further including tube guiding means carried by said tube between an intermediate portion of the outer wall thereof and the inner wall of said passage, said guiding means being movable transversely with respect to said tube, the other end of said tube, which is to be engaged in the end portion of a reactor channel being of tapering shape, so as to be accurately positioned in said channel end portion.

10. A machine according to claim 4 which further comprises an intermediate tube at the end of said passage intended to be fitted on the end of a reactor channel, said intermediate tube being slightly movable in said passage end, with sealing means between said passage end and said intermediate tube, the end of said tube that is to engage the channel end being of frustoconical shape so as to be automatically centered with respect to said channel end when said machine frame is moved toward said reactor.

11. A machine according to claim 1 comprising a cable extending longitudinally through said rod for operating said second hooking means.

References Cited by the Examiner

UNITED STATES PATENTS 2,725,993 12/55 Smith.
2,940,915 6/60 Hammond et al. _____ 176—32
3,051,642 8/62 Dent _____ 176—30

FOREIGN PATENTS 1,192,270 10/59 France.
1,236,554 6/60 France.
1,066,669 10/59 Germany.

CARL D. QUARFORTH, *Primary Examiner.*

REUBEN EPSTEIN, *Examiner.*